(12) United States Patent
Wu et al.

(10) Patent No.: US 11,290,725 B1
(45) Date of Patent: Mar. 29, 2022

(54) SYSTEM AND METHOD FOR DETERMINING AN OBJECTIVE VIDEO QUALITY MEASURE OF A REAL-TIME VIDEO COMMUNICATION WITHOUT EXTENSIVE MATHEMATICAL OPERATIONS

(71) Applicant: Agora Lab, Inc., Santa Clara, CA (US)

(72) Inventors: Xiaoran Wu, Shanghai (CN); Tianbo Chen, Shanghai (CN); Kai Wang, Shanghai (CN); Lin Feng, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 17/154,560

(22) Filed: Jan. 21, 2021

(51) Int. Cl.

| | |
|---|---|
| *H04N 7/12* | (2006.01) |
| *H04N 19/154* | (2014.01) |
| *H04N 19/146* | (2014.01) |
| *H04L 65/80* | (2022.01) |
| *H04N 19/172* | (2014.01) |
| *H04L 65/60* | (2022.01) |
| *H04N 19/184* | (2014.01) |

(52) U.S. Cl.
CPC ......... *H04N 19/154* (2014.11); *H04L 65/607* (2013.01); *H04L 65/80* (2013.01); *H04N 19/146* (2014.11); *H04N 19/172* (2014.11); *H04N 19/184* (2014.11)

(58) Field of Classification Search
CPC .. H04N 19/154; H04N 19/146; H04N 19/172; H04N 19/184; H04L 65/607; H04L 65/80
USPC .................................................. 375/240.26
See application file for complete search history.

(56) References Cited

U.S. PATENT DOCUMENTS

| | | | |
|---|---|---|---|
| 8,891,619 B2* | 11/2014 | Leontaris | H04N 19/14 375/240.12 |
| 9,083,770 B1* | 7/2015 | Drose | H04L 43/087 |
| 2006/0002469 A1* | 1/2006 | Zurov | H04N 19/107 375/240.12 |
| 2015/0020135 A1* | 1/2015 | Frusina | H04N 21/2405 725/116 |
| 2018/0139258 A1* | 5/2018 | Margolin | H04L 47/25 |
| 2019/0392266 A1* | 12/2019 | Zhong | G06K 9/00302 |
| 2020/0267190 A1* | 8/2020 | Drose | H04L 65/80 |

OTHER PUBLICATIONS

QOS Research for Video Conference, Ling Bo, Zhejiang University, Apr. 2008.

* cited by examiner

*Primary Examiner* — Gims S Philippe
(74) *Attorney, Agent, or Firm* — Depeng Bi; The Law Offices of Kornad Sherinian LLC

(57) ABSTRACT

A new real-time video communication system includes a set of electronic devices. Each device runs a specialized real-time video communication software application including a video quality module. The video quality module retrieves network connection statistic data from a network connection module, and video encoder statistic data from a video quality module. The video quality module uses the network connection statistic data and the video encoder statistic data to determine a first objective video quality measure without extensive mathematical operations. The video quality module also uses the first objective video quality measure, the network connection statistic data and the video encoder statistic data to determine a second objective quality measure without extensive mathematical operations.

16 Claims, 5 Drawing Sheets

SYSTEM AND METHOD FOR DETERMINING AN OBJECTIVE VIDEO QUALITY MEASURE OF A REAL-TIME VIDEO COMMUNICATION WITHOUT EXTENSIVE MATHEMATICAL OPERATIONS

CROSS REFERENCE TO RELATED APPLICATIONS

None.

FIELD OF THE DISCLOSURE

The present invention generally relates to real-time video communication, and more particularly relates to a system and method for determining an objective video quality measure. More particularly still, the present disclosure relates to a system and method for determining an objective video quality measure without extensive mathematical operations.

DESCRIPTION OF BACKGROUND

In real-time video communication systems, both audio and video data are exchanged between participating electronic devices (such as laptop computers, desktop computers, tablet computers, smartphones, etc.). Real-time video communication has become more and more popular in recent years. In particular, due to the COVID-19 pandemic, real-time video communication has become widely deployed by for online classrooms, business operations, government agencies and departments, and many other entities.

During real-time video communication, video data captured by a camera of one electronic device is forwarded to one or more other participating electronic devices. The received video data is then displayed on display screens of the receiving electronic devices. Before it is displayed on the receiving devices, the captured video data goes through a number of stages of processing. Such processing and transmission over the underlying connecting network (such as the Internet) sometimes cause degradation to the quality of the video.

However, human beings are very sensitive to visual signal impairment. It is thus crucial to objectively evaluate the quality of the received video. One essential step of the video processing is compression. Accordingly, it is crucially important to quantitatively evaluate the effect of compression on the quality of the received video.

Generally speaking, there are two categories of Video Quality Assessment (VQA)—objective metric and subjective scores. The objective metric includes traditional Peak Signal-to-Noise Ratio (PSNR) and Structural Similarity Index Measure (SSIM). Video Multimethod Assessment Fusion (VMAF) is a newer objective full-reference video quality metric. They measure the video quality based on the loss between the distortion images and reference images. However, each of the conventional objective video quality metric requires a large quantity of mathematical calculations. The big amount of computation itself consumes significantly amount of time, resource of the processing unit (such as CPU), and power. The significant computer resource consumption is not suitable for mobile devices, such as smartphones that have very limited battery life.

Subjective scores are usually generated by crowds. Contributors will watch and then rate the videos. After data cleaning, the mean opinion score (MOS) is generated. The application of the MOS is then a different and difficult issue. The popular methods nowadays are all based on deep learning algorithms. However, deep learning algorithms lead to extensive calculation. In certain situations, such computation is more extensive than the abovementioned objective methods for evaluating video quality. Therefore, the subjective scores are also not applicable for mobile devices.

Accordingly, there is a need for a new system and a new method to quantitatively measure video quality that are applicable for mobile devices. The new method does not involve extensive computation and thus consumes less resource and fits mobile devices. Furthermore, the new method needs to be performed within a real-time video communication electronic device for determining the video quality.

SUMMARY OF THE DISCLOSURE

Generally speaking, pursuant to the various embodiments, the present disclosure provides a computer-implemented method for determining an objective video quality measure of a real-time video communication between a set of participating electronic devices over a network without extensive mathematical operations. The method is performed a real-time video communication system electronic device and includes sending video data to a set of real-time video communication system electronic devices from the real-time video communication system electronic device over the Internet over a network interface. The real-time video communication system electronic device includes a processing unit; a memory operatively coupled to the processing unit; one or more input interfaces operatively coupled to the processing unit; an audio output interface operatively coupled to the processing unit; the network interface operatively coupled to the processing unit; a video output interface operatively coupled to the processing unit; and a video input interface operatively coupled to the processing unit. The sent video data captured by the video input interface. The method also includes an audio input interface operatively coupled to the processing unit; an operating system executed by the processing unit; and a specialized real-time video communication software application adapted to be executed by the processing unit and perform the method. The specialized real-time video communication software application having a video quality module. The method further includes sending audio data, captured by the audio input interface, to the set of real-time video communication system electronic devices over the network interface; receiving video data to from one or more devices within the set of real-time video communication system electronic devices over the network interface; outputting the received video data over the video output interface; receiving audio data to from one or more devices within the set of real-time video communication system electronic devices over the network interface; outputting the received audio data over the audio output interface; the video quality module receiving network connection statistic data from a network connection module, the network connection statistic data indicating status of a network connection with the set of real-time video communication system electronic devices over the network interface, the network connection statistic data including a bitrate; the video quality module receiving video encoder statistic data from a video encoder; the video quality module determining a first objective video quality measure using the network connection statistic data and the video encoder statistic data without expensive mathematical operations;

and the video quality module determining a second objective video quality measure using the first objective video quality measure, the network connection statistic data and the video encoder statistic data without expensive mathematical operations. In one implementation, the video encoder is an H.264 encoder.

Further in accordance with the present teachings is a specialized real-time video communication software application for determining an objective video quality measure of a real-time video communication between a set of participating electronic devices over a network without extensive mathematical operations. The specialized real-time video communication software application is executed within a real-time video communication system electronic device and adapted to send video data to a set of real-time video communication system electronic devices from the real-time video communication system electronic device over the Internet over a network interface; send audio data, captured by the audio input interface, to the set of real-time video communication system electronic devices over the network interface; receive video data to from one or more devices within the set of real-time video communication system electronic devices over the network interface; output the received video data over the video output interface; receive audio data to from one or more devices within the set of real-time video communication system electronic devices over the network interface; output the received audio data over the audio output interface; receive network connection statistic data from a network connection module by the video quality module, the network connection statistic data indicating status of a network connection with the set of real-time video communication system electronic devices over the network interface, the network connection statistic data including a bitrate; receive video encoder statistic data by the video quality module from a video encoder; and by the video quality module, determine a first objective video quality measure using the network connection statistic data and the video encoder statistic data without expensive mathematical operations. The specialized real-time video communication software application is further adapted to, by the video quality module, determine a second objective video quality measure using the first objective video quality measure, the network connection statistic data and the video encoder statistic data without expensive mathematical operations. In one implementation, the video encoder is an H.264 encoder.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
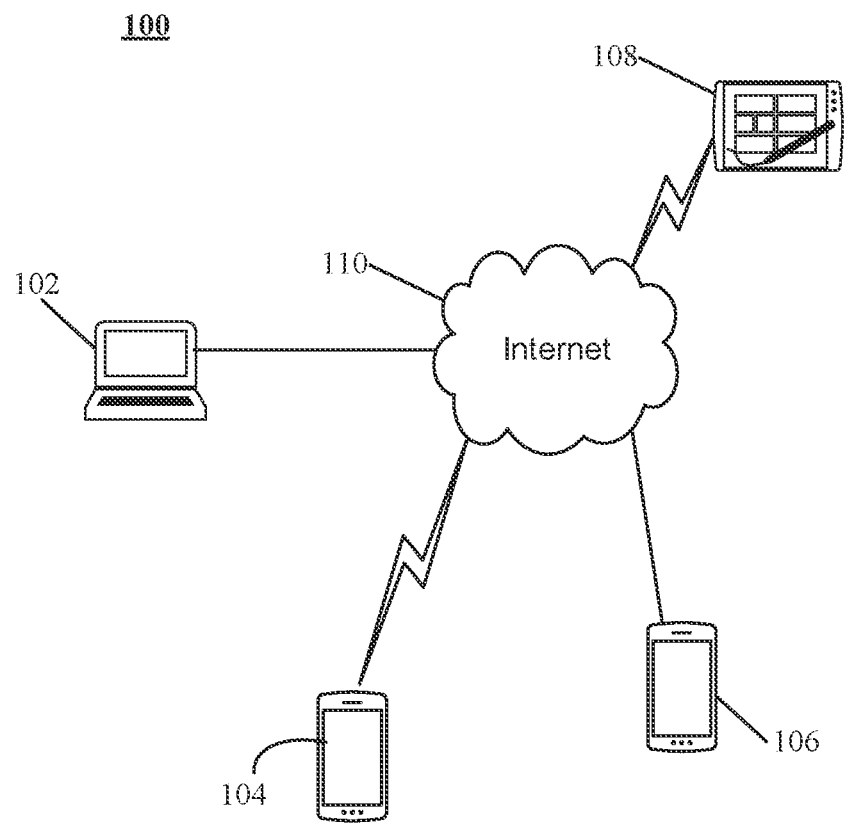
FIG. 1 is an illustrative block diagram of a real-time video communication system in accordance with the teachings of this disclosure.

Turning to the Figures and to FIG. 1 in particular, an illustrative block diagram of a real-time video communication system is shown and generally indicated at 100. The real-time video communication system 100 includes a set of participating electronic devices, such as those indicated at 102, 104, 106 and 108. The real-time video communication system electronic devices 102-108 communicate with each other over the Internet 110. They connect to the Internet 110 via local area networks, such as Wi-Fi networks, public cellular phone networks, Ethernet networks, etc. Each of the electronic devices 102-108 is further illustrated by reference to FIG. 2.

Figure 2:
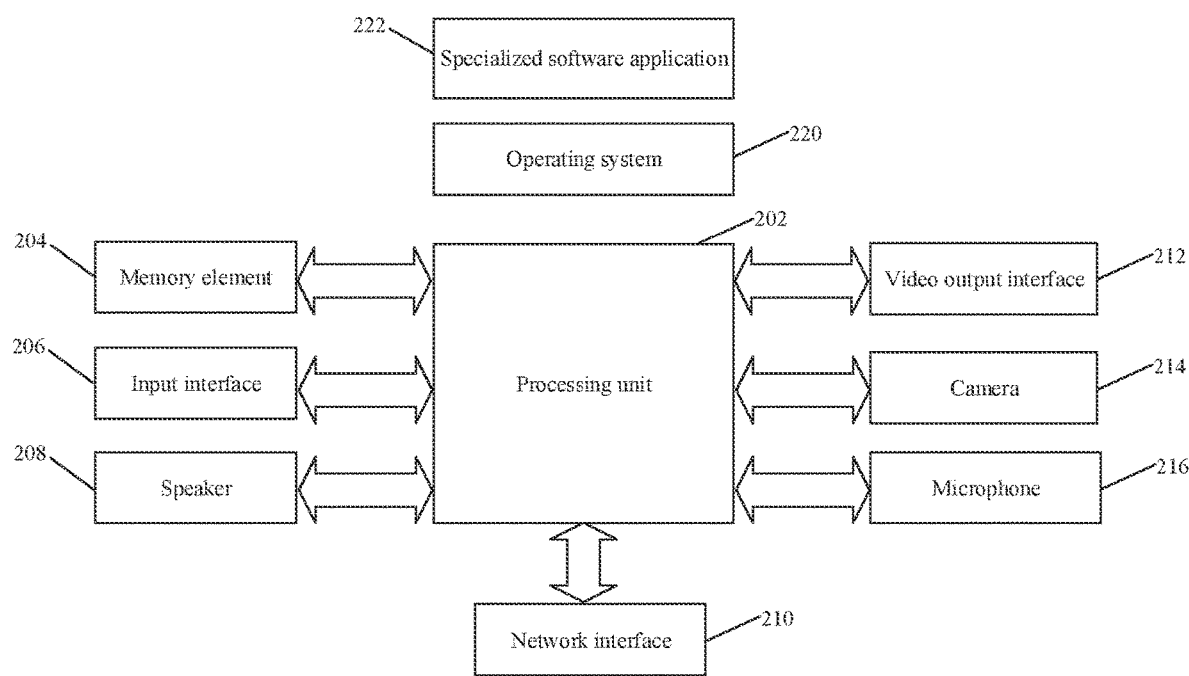
FIG. 2 is an illustrative block diagram of a real-time video communication device in accordance with this disclosure.

Referring to FIG. 2, a simplified block diagram of a real-time video communication device, such as the device 102, is shown. The device 102 includes a processing unit (such as a central processing unit (CPU)) 202, some amount of memory 204 operatively coupled to the processing unit 202, one or more input interfaces (such as a mouse interface, a keyboard interface, a touch screen interface, etc.) 206 operatively coupled to the processing unit 202, an audio output interface 208 operatively coupled to the processing unit 202, a network interface 210 operatively coupled to the processing unit 202, a video output interface 214 (such as a display screen) operatively coupled to the processing unit 202, a video input interface 214 (such as a camera) operatively coupled to the processing unit 202, and an audio input interface 214 (such as a microphone) operatively coupled to the processing unit 202. The device 102 also includes an operating system (such as iOS 10) 220 executed by the processing unit 202, and a specialized real-time video communication software application 222 adapted to be executed by the processing unit 202. The real-time video communication software application 222 is programmed using one or more computer programming languages, such as C, C++, C#, Java, etc. It includes or uses a video encoder, an audio encoder, a video decoder and an audio decoder. As used herein, the encoders and decoders are said to be part of the specialized real-time video communication software application 222.

The specialized real-time video communication software application 222 sends video data (such as frames captured by the video input device 214), and audio data (such as audio data captured by the audio input device 216) to other participating devices, receives video data and/or audio data from other participating devices, and outputs the received data on the device on which it is running. A participating electronic device may only receive data, such as video data, audio data or both. It may also send out and receives data, such as video data, audio data or both.

Figure 3:
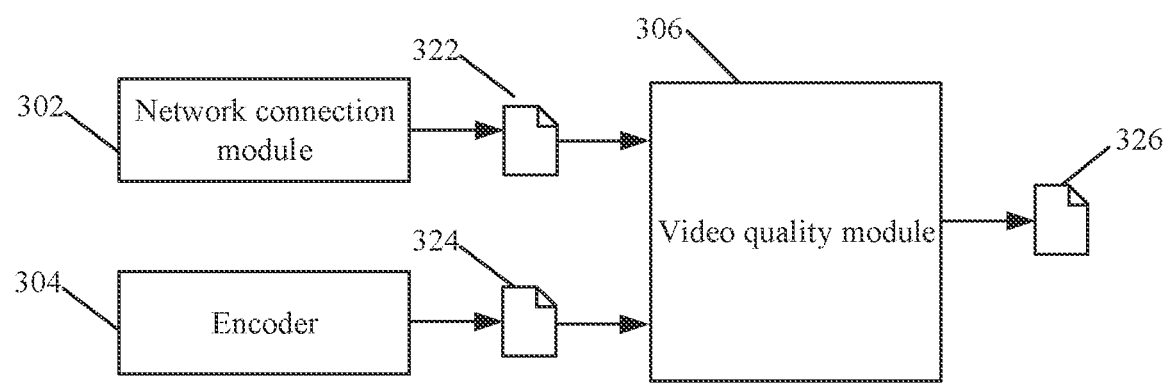
FIG. 3 is an illustrative block diagram of a specialized real-time video communication software application for objectively measure real-time communication video quality without extensive mathematical operations in accordance with this disclosure.

The specialized real-time video communication software application 222 is further illustrated by reference to FIG. 3. Referring to FIG. 3, a simplified block diagram of the specialized real-time video communication software application 222 is shown. The software application 222 includes a network connection module 302 that determines the network connection status and provides network connection status and statistic data 322, a video encoder 304 that encodes video data and provides statistic data 324 of the encoding process performed by the encoder 304, and a video quality module 306. The video quality module 306 takes the network connection statistic data 322 and the video encoder statistic data 324 as input, and outputs quantitative and objective video quality measures 326. In an alternate embodiment, the video encoder 304 is a third-party component. In such a case, for ease of reference, it is also said to be module of the specialized real-time video communication software application 222. Similarly, a third-party network connection module 302 is also said herein to be a component of the specialized real-time video communication software application 222.

A video encoder is a computer software program or a set of programs that encodes raw video data, which is also referred to as sequence. It performs compression on input video data. In one implementation, the video encoder 304 conforms with the H.264 standard and is thus referred to as an H.264 encoder. H.264 (also referred to as Advanced Video Coding, or MPEG-4 Part 10, Advanced Video Coding), is a video compression standard based on block-oriented, motion-compensated integer-DCT coding.

The video quality module 306 is a lightweight real-time video quality determination module because the statistics 324 of the encoder 304 and the statistics 322 of the network connection module 302 are readily available, and do not incur extensive mathematical calculations to obtain them. Such statistic data 322-324 can obtained by, for example, reading a memory location where the data is stored, and calling APIs (Application Programming Interfaces). The network statistics 322, such as bandwidth measured by bitrate, indicate how many bits of video that can be sent per second. It directly affects the video quality on the receiving electronic devices. More bandwidth means better video quality. The network statistics 322 can also include jitter, package-loss, delay, etc. Besides bandwidth and other network statistics 322, video content also plays a vital role in video compression and video quality. Video content can be reflected by the encoder statistics 324.

The video encoder statistics 324 are maintained by the encoder 304, and not derived from complex mathematical calculations in addition to the operations of the video encoder 304. In one implementation, the encoder statistics 324 include the following encoder statistics:

p_avg_qp stands for the average quantity parameters of P frames
frame_rate stands for the number of frames per second
p_16×16I stands for the percentage of 16×16 intra block in P frames
p_8×8I stands for the percentage of 8×8 intra block in P frames
p_4×4I stands for the percentage of 4×4 intra block in P frames
p_16×16 stands for the percentage of 16×16 inter block in P frames
p_16×8 stands for the percentage of 16×8 inter block in P frames
p_8×8 stands for the percentage of 8×8 inter block in P frames
p_skip stands for the percentage of skip block in P frames
y_intra stands for the percentage of intra block in luma
dc_intra stands for the percentage of intra block in chroma DC
ac_intra stands for the percentage of intra block in chroma AC
y_inter stands for the percentage of inter block in luma
dc_inter stands for the percentage of inter block in chroma DC
ac_inter stands for the percentage of inter block in chroma AC A P frame (also referred herein as P-frame) is one type of inter frames in video compression. Chroma DC stands for Chroma Direct Current of transform coefficients. Chroma AC stands for Chroma Alternating Current of transform coefficients.

In a first implementation, the video quality module 306 determines the video quality perceived by the users of the receiving electronic devices of the sent video content based on the first formula below:

$$\text{First\_video\_quality\_measure} = a_1 \times \text{p\_avg\_qp} + a_2 \times \frac{\text{bitrate}}{50} + a_3 \times \frac{\text{p\_avg\_qp}^3}{625} + a_4 \times \log(\text{bitrate}) + a_5$$

The set of coefficients $a_1$ through $a_5$ are weights in the formula above. In one implementation, the first objective video quality measure determined by the formula above is calculated by the electronic device sending the video content. Generally, the p_avg_qp and the bitrate parameters are the most important factors in determining the received video quality. The First_video_quality_measure thus achieves a ninety percent accuracy. In one implementation, Pearson Linear Correlation Coefficient (PLCC) is used to calculate the correlation between the ground truth values and the predict value (i.e., the first objective video quality measure above). The accuracy is determined by a process shown and illustrated in FIGS. 4 and 5.

Figure 4:
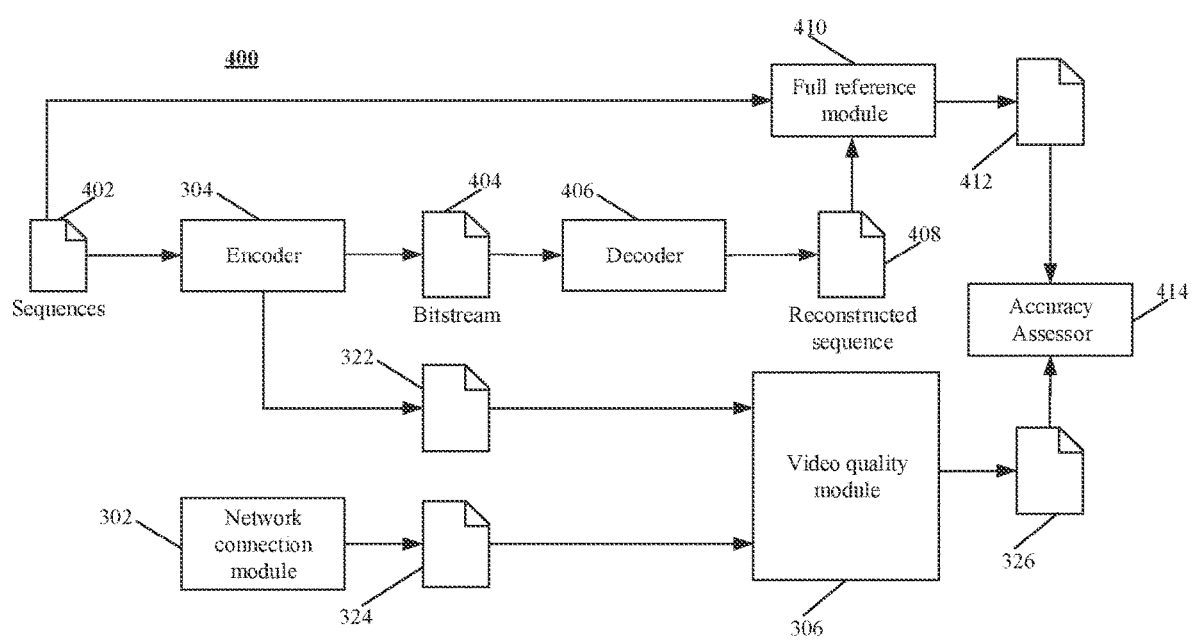
FIG. 4 is a simplified block diagram illustrating the process to assess the accuracy of the objective video quality measures in accordance with this disclosure.

Referring to FIG. 4 first, a simplified block diagram illustrating the process to assess the accuracy of the first objective video quality measure above is shown and generally indicated at 400. Raw video data is in the form of sequences 402. The encoder 304 converts the sequences 402 into a bitstream 404 by compression and other processing. In one implementation, the bitstream 404 is an H.264 format bitstream. To assess the quality distortion level caused by the encoder 304, the decoder 406 decodes the bistream 404 and generates the reconstructed sequence 408. The reconstructed sequence 408 is also referred to as a distorted sequence since it is of less quality due to the compression by the encoder 304 on the original sequences 402. An objective full-reference video quality metric module 410, such as a video multimethod assessment fusion (VMAF) module, operates on the reconstructed sequence 408 and the original sequence 402 to generate an accuracy score 412. This score is also referred to as a ground truth value.

Figure 5:
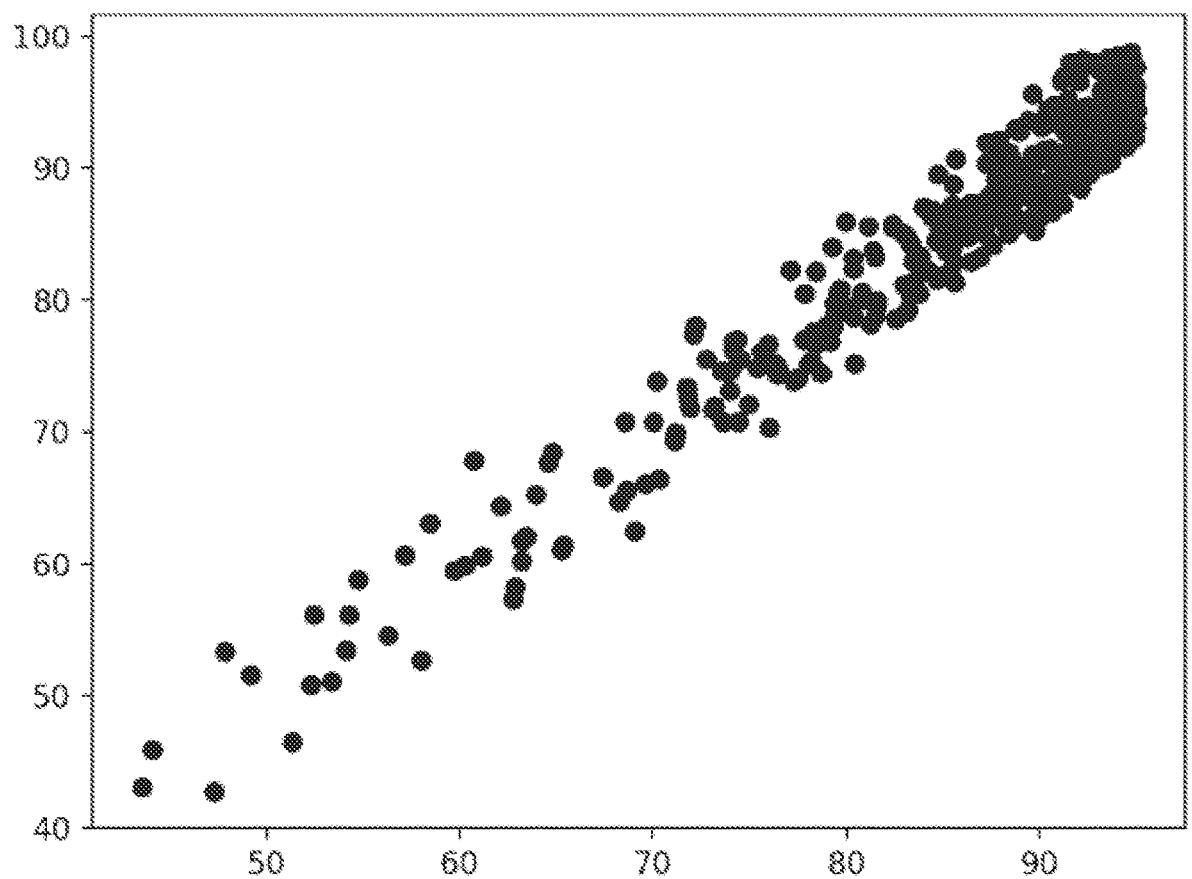
FIG. 5 is a plot diagram showing the correlation between two types of scores measuring video quality in real-time video communication in accordance with this disclosure.

The accuracy assessor module 414 then compares the first objective video quality measure (or the second objective video quality measure set forth below) against the score 412 to determine the accuracy of the first objective video quality measure or the second objective video quality measure set forth below. In one implementation, the accuracy assessor module 414 uses the PLCC to determine the accuracy. The accuracy is measured by the correlation between the score 412 and the score 326. The correlation is further illustrated by reference to FIG. 5. Referring to FIG. 5, a plot diagram showing the correlation between the score 412 and the score 326 is shown. The horizontal axis represents the score 326 while the vertical axis represents the score 412. The fact that the points are generally along the diagonal line indicates the high accuracy of the first objective video quality measure and the second objective video quality measure set forth below.

The first objective video quality measure derived from the formula above requires two division operations with the denominators being integers, a single logarithm operation, a single exponential operation with an exponent of three, four multiplication operations and four addition operations. The exponential operation is essentially equivalent to two multiplication operations. It does not involve any integral operations, derivative operations, root operations (such as 2nd root operations, 3rd root operations, etc.).

In a further implementation, the video quality measure is enhanced, and determined by the second formula below:

Second_video_quality_measure=First_video_quality_measure+$a_6$×frame_rate+$a_7$×$p\_16\times16I$+$a_8$×$p\_8\times8I$+$a_9$×$p\_4\times4I$+$a_{10}$×$p\_16\times16$+$a_{11}$×$p\_16\times8$+$a_{12}$×$p\_8\times8$+$a_{13}$×$p\_skip$+$a_{14}$×$y\_intra$+$a_{15}$×$dc\_intra$+$a_{16}$×$ac\_intra$+$a_{17}$×$y\_inter$+$a_{18}$×$dc\_inter$+$a_{19}$×$ac\_inter$ The set of coefficients $a_6$ through $a_{19}$ are weights in the formula above. The enhanced video quality measure Second_video_quality_measure achieves a ninety-five percent accuracy. The accuracy is determined by the process illustrated in FIGS. 4 and 5. In one implementation, the values of the coefficients $a_1$ through $a_{19}$ are:

$a_1$=−0.206
$a_2$=0.266
$a_3$=−0.386
$a_4$=0.257
$a_5$=−129.61
$a_6$=−0.296
$a_7$=1.997
$a_8$=−2.08$e^{-14}$
$a_9$=2.631
$a_{10}$=2.174
$a_{11}$=2.14
$a_{12}$=2.043
$a_{13}$=2.158
$a_{14}$=0.00942
$a_{15}$=0.1022
$a_{16}$=−0.0374
$a_{17}$=0.0342
$a_{18}$=−0.0137
$a_{19}$=−0.179

The coefficients $a_1$ through $a_{19}$ are weights that may vary between different encoders. The second objective video quality measure derived from the formula above only requires fourteen addition operations and fourteen multiplication operations. Multiplication and addition operations are of extremely low-cost operations on the underlying computers processing unit. It does not involve any integral operations, derivative operations, root operations (such as 2nd root operations, 3rd root operations, etc.) or other mathematical or statistic operations that are expensive in terms of the resource consumption on the underlying computer's processors.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented method for determining an objective video quality measure of a real-time video communication between a set of participating electronic devices over a network connection, said method performed within a real-time video communication system electronic device and comprising:
  (1) sending video data to a set of real-time video communication system electronic devices from said real-time video communication system electronic device over the Internet over a network interface, said real-time video communication system electronic device having:
    (a) a processing unit;
    (b) a memory operatively coupled to said processing unit;
    (c) one or more input interfaces operatively coupled to said processing unit;
    (d) an audio output interface operatively coupled to said processing unit;
    (e) said network interface operatively coupled to said processing unit;
    (f) a video output interface operatively coupled to said processing unit;
    (g) a video input interface operatively coupled to said processing unit, said sent video data captured by said video input interface;
    (h) an audio input interface operatively coupled to said processing unit;
    (i) an operating system executed by said processing unit; and (j) a real-time video communication software application adapted to be executed by said processing unit and perform said method, said real-time video communication software application having a video quality module;

(2) sending audio data, captured by said audio input interface, to said set of real-time video communication system electronic devices over said network interface;

(3) receiving video data to from one or more devices within said set of real-time video communication system electronic devices over said network interface;

(4) outputting said received video data over said video output interface;

(5) receiving audio data to from one or more devices within said set of real-time video communication system electronic devices over said network interface;

(6) outputting said received audio data over said audio output interface;

(7) said video quality module receiving network connection statistic data from a network connection module, said network connection statistic data indicating status of a network connection with said set of real-time video communication system electronic devices over said network interface, said network connection statistic data including a bitrate;

(8) said video quality module receiving video encoder statistic data from a video encoder, said video encoder statistic data including a p_avg_qp, a frame_rate, a p_16×16, a p_8×8I, a p_4×4I, a p_16×16, a p_16×8, a p_8×8, a p_skip, a y_intra, a dc_intra, a ac_intra, a y_inter, a dc_inter, a ac_inter;

(9) said video quality module determining a first objective video quality measure by:

$$\text{First\_video\_quality\_measure} = a_1 \times \text{p\_avg\_qp} + a_2 \times \frac{bitrate}{50} + a_3 \times \frac{\text{p\_avg\_qp}^3}{625} + a_4 \times \log(bitrate) + a_5;$$

(10) said video quality module determining a second objective video quality measure by:

Second_video_quality_measure=First_video_quality_measure+$a_6 \times$frame_rate+$a_7 \times$p_16×16$I$+$a_8 \times$p_8×8$I$+$a_9 \times$p_4×4$I$+$a_{10} \times$p_16×16+$a_{11} \times$p_16×8+$a_{12} \times$p_8×8+$a_{13} \times$p_skip+$a_{14} \times$y_intra+$a_{15} \times$dc_intra+$a_{16} \times$ac_intra+$a_{17} \times$y_inter+$a_{18} \times$dc_inter+$a_{19} \times$ac_inter, and

(11) wherein a1=−0.206, a2=0.266, a3=−0.386, a4=0.257, a5=−129.61, a6=−0.296, a7=1.997, a8=−2.08e-14, a9=2.631, a10=2.174, a11=2.14, a12=2.043, a13=2.158, a14=0.00942, a15=0.1022, a16=−0.0374, a17=0.0342, a18=−0.0137, a19=−0.179.

2. The computer-implemented method of claim 1 wherein said video encoder is an H.264 video encoder.

3. A computer-implemented method for determining an objective video quality measure of a real-time video communication between a set of participating electronic devices over a network, said method performed within a real-time video communication system electronic device and comprising:

(1) sending video data to a set of real-time video communication system electronic devices from said real-time video communication system electronic device over the Internet over a network interface, said real-time video communication system electronic device having:

(a) a processing unit;

(b) a memory operatively coupled to said processing unit;

(c) one or more input interfaces operatively coupled to said processing unit;

(d) an audio output interface operatively coupled to said processing unit;

(e) said network interface operatively coupled to said processing unit;

(f) a video output interface operatively coupled to said processing unit;

(g) a video input interface operatively coupled to said processing unit, said sent video data captured by said video input interface;

(h) an audio input interface operatively coupled to said processing unit;

(i) an operating system executed by said processing unit; and (j) a real-time video communication software application adapted to be executed by said processing unit and perform said method, said real-time video communication software application having a video quality module;

(2) sending audio data, captured by said audio input interface, to said set of real-time video communication system electronic devices over said network interface;

(3) receiving video data to from one or more devices within said set of real-time video communication system electronic devices over said network interface;

(4) outputting said received video data over said video output interface;

(5) receiving audio data to from one or more devices within said set of real-time video communication system electronic devices over said network interface;

(6) outputting said received audio data over said audio output interface;

(7) said video quality module receiving network connection statistic data from a network connection module, said network connection statistic data indicating status of a network connection with said set of real-time video communication system electronic devices over said network interface, said network connection statistic data including a bitrate;

(8) said video quality module receiving video encoder statistic data from a video encoder; and (9) said video quality module determining a first objective video quality measure using said network connection statistic data and said video encoder statistic data w.

4. The computer-implemented method of claim 3 wherein said video encoder is an H.264 video encoder.

5. The computer-implemented method of claim 3, wherein said video encoder statistic data includes a p_avg_qp, and said first objective video quality measure is given by $$\text{First\_video\_quality\_measure} = a_1 \times \text{p\_avg\_qp} + a_2 \times \frac{bitrate}{50} + a_3 \times \frac{\text{p\_avg\_qp}^3}{625} + a_4 \times \log(bitrate) + a_5.$$

6. The computer-implemented method of claim 5, wherein a1=−0.206, a2=0.266, a3=−0.386, a4=0.257, a5=−129.61.

7. The computer-implemented method of claim 5 further comprising, by said video quality module, determining a second objective video quality measure using said first objective video quality measure, said network connection statistic data and said video encoder statistic data.

8. The computer-implemented method of claim 7, wherein said video encoder statistic data includes a frame_rate, a p_16×16I, a p_8×8I, a p_4×4I, a p_16×16, a p_16×8, a p_8×8, a p_skip, a y_intra, a dc_intra, a ac_intra, a y_inter, a dc_inter, a ac_inter, and wherein said second objective video quality measure is given by:

Second_video_quality_measure=First_video_quality_measure+ $a_6$×frame_rate+$a_7$×$p\_16\times16I$+$a_8$×$p\_8\times8I$+$a_9$× $p\_4\times4I$+$a_{10}$×$p\_16\times16$+$a_{11}$×$p\_16\times8$+$a_{12}$×$p\_8\times8$+ $a_{13}$×$p\_skip$+$a_{14}$×$y\_intra$+$a_{15}$×$dc\_intra$+$a_{16}$× $ac\_intra$+$a_{17}$×$y\_inter$+$a_{18}$×$dc\_inter$+$a_{19}$×$ac\_inter$.

9. The computer-implemented method of claim 8, wherein a1=−0.206, a2=0.266, a3=−0.386, a4=0.257, a5=−129.61, a6=−0.296, a7=1.997, a8=−2.08e-14, a9=2.631, a10=2.174, a11=2.14, a12=2.043, a13=2.158, a14=0.00942, a15=0.1022, a16=−0.0374, a17=0.0342, a18=−0.0137, a19=−0.179.

10. A real-time video communication software application for determining an objective video quality measure of a real-time video communication between a set of participating electronic devices over a network, said real-time video communication software application executed within a real-time video communication system electronic device and adapted to:
  1) send video data to a set of real-time video communication system electronic devices from said real-time video communication system electronic device over the Internet over a network interface, said real-time video communication system electronic device having:
    (a) a processing unit;
    (b) a memory operatively coupled to said processing unit;
    (c) one or more input interfaces operatively coupled to said processing unit;
    (d) an audio output interface operatively coupled to said processing unit;
    (e) said network interface operatively coupled to said processing unit;
    (f) a video output interface operatively coupled to said processing unit;
    (g) a video input interface operatively coupled to said processing unit, said sent video data captured by said video input interface;
    (h) an audio input interface operatively coupled to said processing unit; and
    (i) an operating system executed by said processing unit, wherein said real-time video communication software application adapted to be executed by said processing unit, said real-time video communication software application having a video quality module;
  2) send audio data, captured by said audio input interface, to said set of real-time video communication system electronic devices over said network interface;
  3) receive video data to from one or more devices within said set of real-time video communication system electronic devices over said network interface;
  4) output said received video data over said video output interface;
  5) receive audio data to from one or more devices within said set of real-time video communication system electronic devices over said network interface;
  6) output said received audio data over said audio output interface;
  7) receive network connection statistic data from a network connection module by said video quality module, said network connection statistic data indicating status of a network connection with said set of real-time video communication system electronic devices over said network interface, said network connection statistic data including a bitrate;
  8) receive video encoder statistic data by said video quality module from a video encoder; and
  9) by said video quality module, determine a first objective video quality measure using said network connection statistic data and said video encoder statistic data w.

11. The computer-implemented method of claim 10 wherein said video encoder is an H.264 video encoder.

12. The real-time video communication software application of claim 10, wherein said video encoder statistic data includes a p_avg_qp, and said first objective video quality measure is given by:

First_video_quality_measure =
$$a_1 \times \text{p\_avg\_qp} + a_2 \times \frac{bitrate}{50} + a_3 \times \frac{\text{p\_avg\_qp}^3}{625} + a_4 \times \log(bitrate) + a_5.$$

13. The real-time video communication software application of claim 12, wherein a1=−0.206, a2=0.266, a3=−0.386, a4=0.257, a5=−129.61.

14. The real-time video communication software application of claim 12, wherein said real-time video communication software application is further adapted to, by said video quality module, determine a second objective video quality measure using said first objective video quality measure, said network connection statistic data and said video encoder statistic data.

15. The real-time video communication software application of claim 14, wherein said video encoder statistic data includes a frame_rate, a p_16×16I, a p_8×8I, a p_4×4I, a p_16×16, a p_16×8, a p_8×8, a p_skip, a y_intra, a dc_intra, a ac_intra, a y_inter, a dc_inter, a ac_inter, and wherein said second objective video quality measure is given by:

Second_video_quality_measure=First_video_quality_measure+ $a_6$×frame_rate+$a_7$×$p\_16\times16I$+$a_8$×$p\_8\times8I$+$a_9$× $p\_4\times4I$+$a_{10}$×$p\_16\times16$+$a_{11}$×$p\_16\times8$+$a_{12}$×$p\_8\times8$+ $a_{13}$×$p\_skip$+$a_{14}$×$y\_intra$+$a_{15}$×$dc\_intra$+$a_{16}$× $ac\_intra$+$a_{17}$×$y\_inter$+$a_{18}$×$dc\_inter$+$a_{19}$×$ac\_inter$.

16. The real-time video communication software application of claim 15, wherein a1=−0.206, a2=0.266, a3=−0.386, a4=0.257, a5=−129.61, a6=−0.296, a7=1.997, a8=−2.08e-14, a9=2.631, a10=2.174, a11=2.14, a12=2.043, a13=2.158, a14=0.00942, a15=0.1022, a16=−0.0374, a17=0.0342, a18=−0.0137, a19=−0.179.

* * * * *